Patented Oct. 18, 1949

2,485,212

UNITED STATES PATENT OFFICE 2,485,212

2 - [PHENTHIAZINYL - (N) - METHYL]-IMIDAZOLINES, THE CORRESPONDING 2-(PHENOXAZINYL) IMIDAZOLINES, AND THEIR SALTS

Karl Miescher, Riehen, and Adrian Marxer, Basel, Switzerland, assignors to Ciba Pharmaceutical Products, Inc., Summit, N. J.

No Drawing. Application February 9, 1948, Serial No. 7,294. In Switzerland February 14, 1947

5 Claims. (Cl. 260—243)

The present invention relates to 2-[phenthiazinyl - (N) - methyl] - imidazolines, the corresponding 2-(phenoxazinyl)-imidazolines, and their salts.

A primary object of the present invention is the development of a new series of therapeutically useful chemical compounds.

A further object of the invention is the development, more particularly, of a new group of chemical compounds characterized by sympathicolytic activity.

The new imidazolines may be represented by the formula

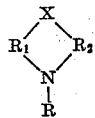

wherein each of $R_1$ and $R_2$ represents an orthophenylene group bound to X and N, X represents a sulfur atom or an oxygen atom, and R stands for an imidazolinyl-(2)-alkyl group. Then phenylene groups may be unsubstituted or substituted, for example by alkyl such as methyl or ethyl; by free, etherified or esterified hydroxy groups such as alkoxy, aralkoxy or acyloxy groups, for example methoxy, ethoxy, propyloxy, butyloxy, benzyloxy, acetoxy, benzoyloxy and the like; or also by amino or nitro groups or halogen atoms. The imidazoline as well as the alkyl radicals of the 2-hydroxy-alkyl-imidazoline may also contain substituents such, for example, as alkyl (methyl, ethyl, propyl, etc.) or the like. Sympathicolytic activity is exhibited more especially by those compounds of the foregoing formula wherein X is a sulfur atom, for example, 2-[phenthiazinyl-(N)-methyl]-imidazoline.

It has been found that the foregoing and other objects, which will be manifest to the skilled in the art from the following description, are realized by a process wherein a reactive ester of a 2-hydroxyalkyl-imidazoline is reacted with a compound of the formula

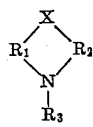

wherein $R_1$, $R_2$ and X have the afore-indicated meanings, and $R_3$ stands for a residue which splits off during the reaction, for instance, a hydrogen atom or a metal atom such as a sodium atom.

As reactive esters of 2-hydroxyalkyl-imidazolines, use is preferably made of esters of strong inorganic and organic acids such, for example, as hydrohalogenic acids as well as alkyl- and aryl-sulfonic acids. These esters are preferably reacted in the form of their salts. The metal compounds of the phenthiazines and phenoxazines are advantageously used only when the latter contain no free hydroxy groups. The reaction may be carried out in the presence or absence of diluents and/or condensing agents.

According to an alternative embodiment of the invention, the said new compounds may also be prepared by reacting a carboxylic acid of the formula

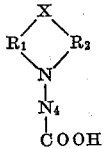

wherein $R_1$, $R_2$ and X have the previously given meanings and $R_4$ stands for an alkylene chain, or a reactive derivative of such acid, with an alkylene diamine wherein the amino groups are on adjacent carbon atoms.

As derivatives of such acids, use may be made for example of the imidoethers, imidohalides, thioamides, thioimidoethers, amides, esters, halides, amidines and nitriles. Instead of starting with an acid derivative itself, the process may be carried out under such conditions as to produce the desired derivative during the course of the reaction. Thus, for example, in lieu of starting with a thioamide, it is possible to react the corresponding nitrile in presence of hydrogen sulfide. In this connection, the hydrogen sulfide may also be produced in the course of the reaction from $H_2S$-yielding agents such as carbon disulfide, phosphorus pentasulfide, alkali metal sulfides, alkaline earth metal sulfides, ammonium sulfides, iron sulfide or aluminium sulfide, if necessary in the presence of small quantities of water. For the direct reaction between a nitrile and an alkylene diamine, the latter is preferably used in the form of a mono-salt. The alkylene diamine may be substituted at the carbon, for example, by alkyl such as methyl, ethyl or propyl; it may also be substituted at the nitrogen. Thus, the reaction may be carried out with N,N'-ethyl-eneurea.

Specific reaction conditions vary in accordance with the starting materials. Thus, the reaction may be carried out in the presence or absence of diluents and/or condensing agents, at low or high temperatures and at various pressures. More-over, an excess of one reaction component may be employed. The process may also be carried out in two stages, wherein for instance the acyl derivative of the alkylene diamine is first prepared and this heated with an agent for splitting off water, such as calcium oxide.

The starting materials employed in the present invention are known or may be prepared according to known methods described for instance in U. S. Patent No. 2,252,723, J. American Society, vol. 66, page 891 (1944), Beilstein, Handbuch der organischen Chemie, vol. 27, page 62 (4th edition, 1937).

In the products obtained according to the present invention, any alkoxy group which may be present may be converted into a free hydroxy group with the aid of hydrolyzing agents, and any aralkoxy group, such for example as the benzyloxy group which may be present may be converted into free hydroxy by means of catalytically activated hydrogen or hydrolyzing agents. Products with free hydroxy groups may be converted with the aid of esterifying or etherifying agents respectively, into esters of for example aliphatic acids such as acetic acid, propionic acid or butyric acid, or of aromatic acids such as benzoic acid, or into ethers such as for example alkyl- or amino-alkyl ethers.

The resultant imidazolines readily form salts with inorganic or organic acids, as for example hydrohalogenic acids such as hydrochloric acid, sulphuric acid, phosphoric acid, methanesulfonic acid, or toluenesulfonic acid, acetic acid, tartaric acid and the like.

The invention is described in greater detail in the following illustrative examples, without however intending thereby in any way to restrict the scope thereof. In these examples, the relationship between parts by weight and parts by volume is the same as that between the gram and cubic centimeter. The temperatures are in degrees centigrade.

*Example 1*

79.7 parts by weight of phenthiazine and 31.0 parts by weight of 2-chloromethyl-imidazoline-hydrochloride are stirred with 200 parts by volume of o-dichlorobenzene for 14 hours in an oil-bath at 150° C. After cooling, the reaction product is diluted with ether and is extracted several times with water. Sandy crystals of the hydrochloride of 2 - [phenthiazinyl - (N) - methyl]-imidazoline separate from the aqueous fractions, particularly upon cooling, and these are suction filtered; upon concentration under reduced pressure and subsequent cooling, additional quantities of this compound are obtained from the mother liquors. The compound can be purified by recrystallization from alcohol-ethyl acetate, whereupon it melts at 241–243° and corresponds to the formula

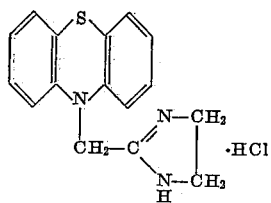

*Example 2*

23.8 parts by weight of phenthiazinyl-(N)-acetic acid nitrile (prepared from phenthiazine, formaldehyde and hydrocyanic acid) are admixed with 7.2 parts by weight of ethylene diamine and approximately 0.2 part by weight of hydrogen sulfide introduced into the mixture. The latter is then heated on the water-bath until splitting off of ammonia ceases, the excess of ethylene diamine removed, the reaction product taken up in dilute mineral acid, the aqueous solution made alkaline and the thus-obtained base converted in alcoholic solution into the hydrochloride of 2-[phenthiazinyl-(N)-methyl]-imidazoline, which is identical with the compound described in Example 1.

The same compound may also be obtained by heating the phenthiazinyl-(N)-acetic acid nitrile with a mono-salt of ethylene diamine, such for example as ethylene diamine-mono-p-toluene-sulfonate, isolating the base and converting the latter into its hydrochloride.

*Example 3*

19.92 parts by weight of phenthiazine in 150 parts by volume of dry benzene and 4.70 parts by weight of sodamide are refluxed for 2 hours while stirring. Thereupon, at an interior temperature of about 60°, there is added dropwise a benzene solution of 2-chloromethyl-imidazoline, which has been liberated from 18.60 parts by weight of 2 - chloromethyl - imidazoline - hydrochloride by means of potassium hydroxide. The mixture is then kept for 2 more hours at boiling temperature, cooled, and the benzene solution first extracted with water and then with dilute hydrochloric acid. The hydrochloric acid extracts are evaporated in vacuo and concentrated sodium chloride solution added thereto. The hydrochloride of 2-[phenthiazinyl-(N)-methyl]-imidazoline crystallizes out, and is then recrystallized from alcohol-ethyl acetate. It is identical with the product of Example 1.

*Example 4*

18.32 parts by weight of phenoxazine are fused in the oil-bath, the temperature lowered to 160° and 15.50 parts by weight of 2-chloromethyl-imidazoline-hydrochloride added, while stirring. After stirring for 2 hours at 150° in an atmosphere of nitrogen, the contents of the reaction vessel solidify. The cooled reaction product is comminuted, extracted by boiling with 350 parts by weight of water and filtered. The water is evaporated under reduced pressure, the residue taken up in hot absolute alcohol, again filtered and, after addition of ethyl acetate, cooled. The hydrochloride of 2-[phenoxazinyl-(N)-methyl]-imidazoline crystallizes out. Upon further crystallization, it melts at 238–239°. It corresponds to the formula

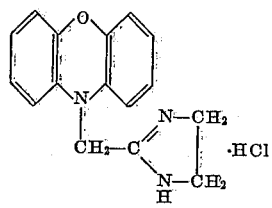

In the same manner the 2-[2',7'-dimethyl-phenoxazinyl - (N) - methyl] - imidazoline-hydrochloride is obtained when 2,7 - dimethyl-phenoxazine is used as starting material.

*Example 5*

22.93 parts by weight of 2-methoxy-phenthiazine and 15.50 parts by weight of 2-chloromethyl-imidazoline-hydrochloride are boiled for 12 hours in 125 parts by volume of butyl alcohol. A light stream of nitrogen is passed over the mass during the reaction. The filtered butyl alcohol solution is evaporated under reduced pressure, the residue shaken out with ether and water, the water removed in vacuo, the resinous residue dissolved in absolute alcohol and fractionally precipitated with ethyl acetate. The first dark fractions are discarded. From the subsequently precipitated resin, the crystalline 2-[2'-methoxyphenthiazinyl-(N)-methyl] - imidazoline-hydrochloride of the formula

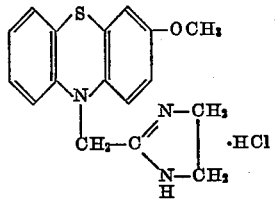

can be isolated upon standing for a long time. The product, recrystallized from alcohol-ethyl acetate has a melting point of 211-213°.

When reacting 2-chloromethylimidazoline-hydrochloride in an analogous manner with 2,7-dimethyl-phenthiazine there is obtained 2-[2',7'-dimethyl-phenthiazinyl-(N)-methyl] - imidazoline-hydrochloride of the formula

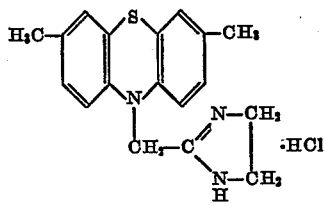

when 2-methyl-phenthiazine is used as starting material, 2-[2'-methylphenthiazinyl-(N)-methyl]-imidazoline-hydrochloride of the formula

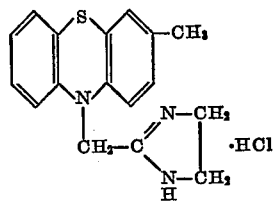

is obtained. When 1-methyl-2-chloromethyl-imidazoline-hydrochloride is used as reaction component in lieu of 2-chloromethyl-imidazoline-hydrochloride the following compounds are obtained: 1-methyl-2-[2'-methoxy-phenthiazinyl-(N)-methyl]-imidazoline-hydrochloride, 1-methyl-2-[2',7'-dimethyl-phenthiazinyl - (N) - methyl]-imidazoline-hydrochloride and 1-methyl-2-[2'-methyl-phenthiazinyl-(N) - methyl]-imidazoline-hydrochloride.

Example 6

The quantities of 2-methoxy-phenthiazine and 2 - chloromethyl - imidazoline - hydrochloride set forth in Example 5 are stirred in 150 parts by volume of ortho-dichlorobenzene for 15 hours at 150° in a stream of nitrogen. From the cooled solution, there separates a violet amorphous mass which is isolated by suction filtration and can be dissolved for the greater part in water. The filtered aqueous solution is evaporated in vacuo, the residue taken up in absolute alcohol and fractionally precipitated by means of ethyl acetate. The first precipitated fractions are discarded and the subsequent precipitations are reprecipitated from alcohol by means of ethyl acetate, whereupon crystallization gradually takes place. The product is clearly soluble in dilute caustic soda solution, which establishes that the methoxy group has been converted to the hydroxy group. Accordingly the product is the 2-[2'-hydroxy-phenthiazinyl-(N)-methyl]-imidazoline - hydrochloride of the formula

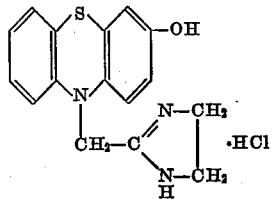

Having thus disclosed the invention, what is claimed is:

1. A member selected from the group consisting of the 2-(oxazinylalkyl)-imidazolines of the formula

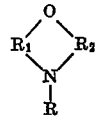

wherein each of $R_1$ and $R_2$ stands for an ortho-phenylene group connected to O and N, O being a member of the N-containing six-membered ring, and R stands for an imidazolinyl-(2)-alkyl group, the corresponding 2-(thiazinylalkyl)-imidazolines, and the salts of the said compounds.

2. A 2 - [phenthiazinyl-(N)-methyl]-imidazoline and its salts.

3. 2 - [phenthiazinyl-(N)-methyl]-imidazoline and its salts.

4. A 2-[phenoxazinyl-(N)-methyl]-imidazoline and its salts.

5. 2-[phenoxazinyl-(N)-methyl] - imidazoline and its salts.

KARL MIESCHER.
ADRIAN MARXER.

No references cited.

Certificate of Correction

Patent No. 2,485,212                                                                October 18, 1949

KARL MIESCHER ET AL.

It is hereby certified that errors appear in the printed specification of the above numbered patent requiring correction as follows:

Column 1, line 23, for the word "Then" read *The*; column 2, lines 18 to 20, for that portion of the formula reading

and that the said Letters Patent should be read with these corrections therein that the same may conform to the record of the case in the Patent Office.

Signed and sealed this 7th day of February, A. D. 1950.

[SEAL]

THOMAS F. MURPHY,
                                                                   *Assistant Commissioner of Patents.*